United States Patent Office 3,037,292
Patented June 5, 1962

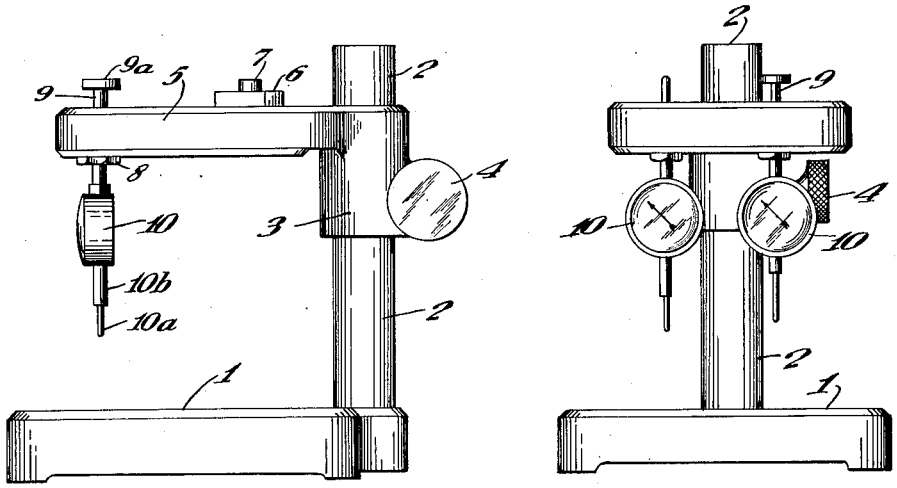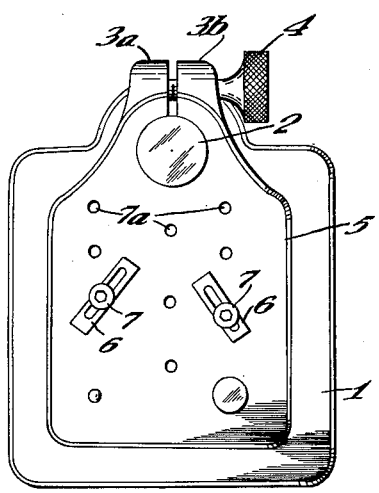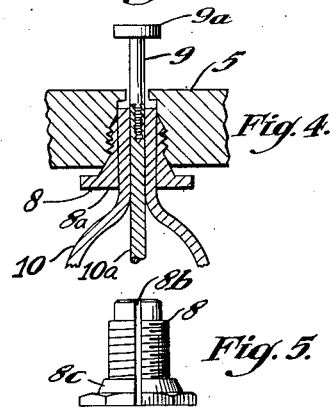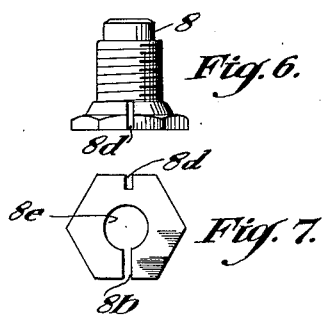
Fig. 1. Fig. 2. Fig. 3. Fig. 4. Fig. 5. Fig. 6. Fig. 7.
INVENTOR.
John J. Schuler.
BY
William J. Ruano
ATTORNEY.

3,037,292
MEASURING INSTRUMENT
John J. Schuler, 722 Church St., Reading, Pa.
Filed Feb. 26, 1959, Ser. No. 795,845
1 Claim. (Cl. 33—147)

This invention relates to a measuring instrument or gage and, more particularly, to a mounting for measuring gages or dial indicators to permit a wide variety of measurements.

An outstanding disadvantage of conventionally used measuring gages is that they are not easily or quickly mounted, nor mountable when inverted, therefore they do not afford the opportunity of making a wide variety of measurements of such dimensions as hole depths, steps, outside and inside diameters and the like of an article.

A further objection is that the mounting means for the measuring gage usually clamps the gage so tightly as to damage the gage and affect its accuracy.

An object of my invention is to provide a measuring gage which is devoid of the above named disadvantages and which will enable measurements either underneath or above a supporting bracket.

Another object of my invention is to provide a novel measuring instrument or gage for enabling easy and quick mounting of the dial indicator, or plurality of such dial indicators, so as to enable high accuracy of measurement and to enable a wider variety of measurements than heretofore possible.

Other objects and advantages of my invention will become more apparent from a study of the following description taken with the accompanying drawing wherein:

FIGURE 1 is a side elevational view of a measuring instrument embodying the principles of the present invention;

FIGURE 2 is a front elevational view of the instrument shown in FIG. 1;

FIGURE 3 is a top or plan view of the instrument shown in FIGS. 1 and 2;

FIGURE 4 is a vertical cross-sectional view taken through the split clamping nut and associated parts shown in FIGS. 1 and 2;

FIGURE 5 is a side elevational view of the split nut shown in FIGS. 1, 2 and 4;

FIGURE 6 is a similar view showing the opposite side of the nut; and

FIGURE 7 is a top view of a nut shown in FIGS. 5 and 6.

Referring more particularly to FIGS. 1 to 7 inclusive, numeral 1 denotes a steel base upon which is integrally mounted a column 2 for supporting a bracket 3, which is vertically slidable on the column and which may be held and clamped thereto at selected heights by first unscrewing screw 4. The screw 4, upon screwing the threaded portion thereof in the portions 3a and 3b of a collar portion of the bracket 3, will move these portions together into clamping engagement with the column 2. It will be noted that the split between 3a and 3b is only through a portion of the height of bracket 3, the remaining portion being integral, this being sufficient clamping engagement for holding the bracket in place.

Numeral 5 denotes a bracket base or platform portion upon which may be mounted one or more indicating or dial gages 10 of well known type wherein part 10a telescopically fits and slides into the stationary sleeve 10b against the action of a spring (not shown) when the point of part 10a engages the part to be measured. These gages may be mounted either in one position or in an inverted position, as desired, in accordance with the present invention.

An important feature of the present invention resides in the manner that the dial indicators 10 are mounted on the supporting bracket 3. One or more vertical holes are provided in the platform portion of bracket 3 and are of the shape shown in FIG. 4, that is, having a top portion of minimum diameter, a central threaded portion, and a lower portion tapered downwardly and outwardly. A split nut, such as shown in FIGS. 5, 6 and 7, is screw threaded into the above-mentioned threaded hole. The nut, as will be noted, contains a split portion 8b extending throughout its height and a partially split portion 8d on the opposite side thereof which goes through only the head portion of the nut and the tapered collar portion 8c. Therefore, as the nut is screw threaded into the hole, it will first penetrate the hole and when the tapered portion 8c engages the corresponding tapered portion of the hole, the split nut will clamp together, that is to say, the split or gap 8b will become smaller so as to shrink the inside diameter of the nut and tightly clamp the shank portion 8a of a measuring gage or indicator 10 of any conventional type having a movable indicator spindle 10a. Thus the shank portion may be selectively lifted or lowered just by simply unscrewing the nut.

It will be further noted that measuring gages 10 may be mounted either in one position or in an inverted position, since the shank thereof may be held together in the same way.

In order to facilitate holding the work on top of the bracket 5, a plurality of holes, such as 7a, are provided into which may be screw threaded bolt like members 7 which have shank portions extending through slots in holder blocks 6 so that the blocks may be held in any desired angular position by tightly clamping the specimen or piece tested. By providing a plurality of holes 7a the blocks may be selectively placed into position on top of bracket 5.

In order to facilitate measuring groove distances and the like, a large collar portion 9a is provided on top of the shank 9 of the measuring device. As the specimen being measured is laid on top of bracket 5 with a well portion thereof contained therein, the portion 9a will abut against the bottom of the well and the dial indicator will measure the depth of the groove.

The dial indicator illustrated to the left of FIG. 2, that is, with a shank portion extending vertically upwardly through the bracket or support 5, is particularly suitable for measuring hole depths and steps inside and outside of a specimen. That is, a specimen is laid on top of collar portion 9a, for example, a specimen of cup shape is laid in inverted position, and the movable shank portion 10a is moved downwardly to show the depth of the cup. Similarly the depth of a step inside or outside the specimen may be measured.

For a variety of measurements, it is desirable to have a pair of dial indicators, such as illustrated in FIG. 2, one with a collar portion 9a extending from the top thereof, and one without such portion so as to measure all desired dimensions of a specimen.

Furthermore, a specimen may be laid on top of the supporting base 1, between the surface of the base and the platform portion 5 so as to measure the height of the specimen. In this way, therefore, it may be seen that practically any measurement desired of a specimen may be made, irrespective of the size of the specimen or the nature of the various portions to be measured.

Thus it will be seen that I have provided an efficient measuring gage assembly for enabling easy and quick mounting of one or more dial indicators and for enabling the use of the dial indicators in a manner so as to measure a wide variety of dimensions irrespective of the configuration or the size of the specimen being measured; furthermore, I have provided a split nut type of clamp for clamping onto dial indicators or measuring gages in an upright or an inverted position so as to enable the use of one or more of such gages, arranged in either upright or inverted position, so as to measure specimens either on top of the bracket or on top of the base, as desired, and for easily measuring a number of dimensions heretofore involving difficulty.

While I have illustrated and described a single specific embodiment of my invention, it will be understood that this is by way of illustration only, and that various changes and modifications may be made within the contemplation of my invention and within the scope of the following claim.

I claim:

A measuring gage comprising a base, a column extending vertically upwardly therefrom and integral therewith, a supporting bracket adjustably clamped to said column at selective heights and having an integral platform extending horizontally and overlying said base, said platform having a plurality of vertically extending holes, each hole wall having a top portion of minimum diameter, a central threaded portion and a lower, outwardly tapered portion, a plurality of longitudinally split, centrally bored, nuts screw threaded into said holes, each nut having a threaded, intermediate shank portion screw threaded to said central threaded portion of the hole wall and an outwardly tapered end portion engageable with said outwardly tapered portion of said hole wall so as to shrink the diameter of the threaded portion as the result of wedging action of said tapered portion of the nut and hole wall, each nut engageable with a collar formed by said top portion of the hole wall of smaller diameter to limit the extent of upward movement of the nut, and a measuring gage having a shank portion extending through one of said nuts for clamping engagement thereby, and whereby limited clamping is provided to avoid damage to the shank of the measuring gage clamped.

References Cited in the file of this patent

UNITED STATES PATENTS

| | | |
|---|---|---|
| 2,040,917 | Briskin | May 19, 1936 |
| 2,592,840 | Bauer | Apr. 15, 1952 |
| 2,651,845 | Kiehl et al. | Sept. 15, 1953 |
| 2,769,242 | Lienhard | Nov. 6, 1956 |